Jan. 27, 1925.                                                                1,524,554
J. S. KEEN
CROSSHEAD CONNECTION FOR PISTON RODS
Filed Sept. 25, 1924
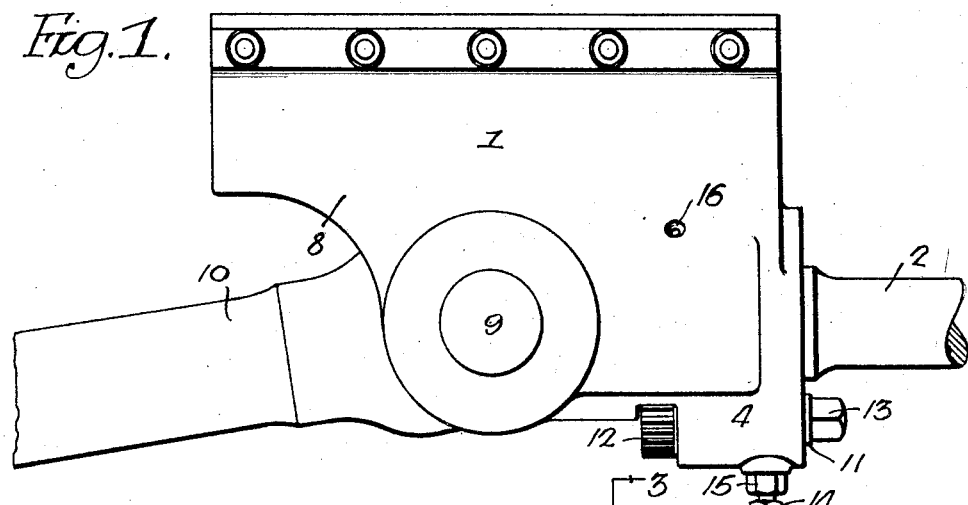
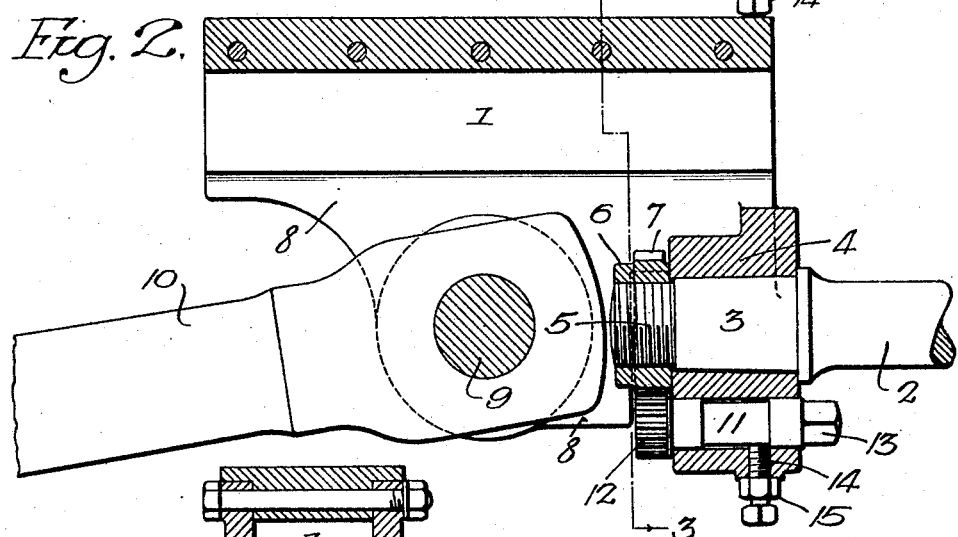
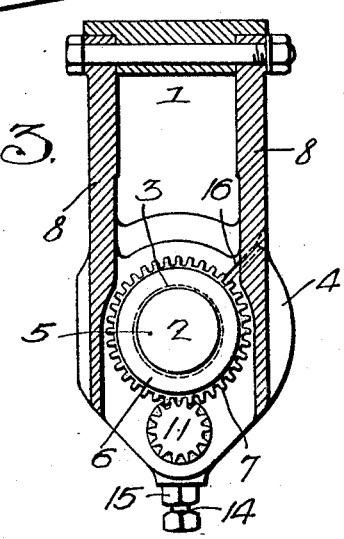
Inventor.-
John S. Keen.
by his Attorney
Howson Howson Patented Jan. 27, 1925.

1,524,554

UNITED STATES PATENT OFFICE.

JOHN S. KEEN, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

CROSSHEAD CONNECTION FOR PISTON RODS.

Application filed September 25, 1924. Serial No. 739,873.

*To all whom it may concern:*

Be it known that I, JOHN S. KEEN, a citizen of the United States, residing in Philadelphia, Pennsylvania, have invented Crosshead Connections for Piston Rods, of which the following is a specification.

My invention relates to certain improvements in the means for connecting the piston rod of a locomotive, or other engine, to the cross head.

One object of the invention is to construct the connection so that the rod is held firmly in the cross head.

A further object of the invention is to design the connection so that it can be located in the cross head without weakening the cross head.

In the accompanying drawings:

Fig. 1 is a side view showing the invention applied to a piston rod and cross head of a locomotive;

Fig. 2 is a longitudinal sectional view; and

Fig. 3 is a transverse sectional view on the line 3—3, Fig. 2.

The cross head 1 of the locomotive is arranged to slide in suitable guides, which are not shown. The piston rod 2 has a tapered end 3 that fits in a tapered opening in the depending portion 4 of the cross head. The extreme end 5 of the rod is reduced and is threaded, as shown in Fig. 2. The threaded end 5 of the rod 2 projects between the portion 4 of the cross head. On this portion is a nut 6, which has an annular series of teeth 7. The toothed portion of the nut fits the space between the two cheeks 8. These cheeks form the bearings for the pin 9, which is the pivot for a connecting rod 10. The cheeks are recessed slightly to allow the nut to turn clear of the cross head, as shown in Fig. 3.

Located in the depending portion below the rod 1 is a spindle 11 that has at one end a pinion 12, which meshes with the toothed nut 6. At the opposite end of the spindle is a head 13, which is shaped to receive a wrench, or other tool. The spindle 11 is recessed at the center, as shown in the drawings. In the portion 4 of the cross head is a set screw 14, on which is a jamb nut 15. This screw holds the spindle against longitudinal movement and also prevents the spindle from turning when it is tightened after the parts have been adjusted.

In the cross head is a diagonal oil hole 16, which leads to the space between the face of the nut and the end of the depending portion of the cross head.

By the construction hereinbefore described, the piston rod is secured firmly to the cross head. The parts can be readily removed for repairs and can be tightened, when necessary.

I claim:

1. The combination of a cross head having a depending portion, in which is a tapered opening; a piston rod having a tapered portion located in the opening and having a screw-threaded end; a circular nut on the threaded end of the rod bearing against the depending portion of the cross head; and means, carried by the cross head, for turning the nut.

2. The combination of a cross head; a piston rod having a tapered end located in the tapered opening of the cross head; a nut on the end of the rod, said nut having teeth at the periphery; a spindle; and a pinion on the spindle engaging the teeth, said pinion being arranged to adjust a nut on the rod.

3. The combination of a cross head having a depending portion in which there is a tapered opening; a piston rod having a tapered portion located in the opening, said rod having a threaded end; a nut on the threaded end, said nut having teeth on its periphery; a spindle extending through the depending portion and having a pinion meshing with the teeth on the nut, the opposite end of the spindle being shaped to receive a wrench; and a set screw for retaining the spindle in the position in which it is adjusted.

JOHN S. KEEN.